United States Patent [19]
Coleman et al.

[11] Patent Number: 5,889,990
[45] Date of Patent: Mar. 30, 1999

[54] INFORMATION APPLIANCE SOFTWARE ARCHITECTURE WITH REPLACEABLE SERVICE MODULE PROVIDING ABSTRACTION FUNCTION BETWEEN SYSTEM LIBRARY AND PLATFORM SPECIFIC OS

[75] Inventors: Patrick J. Coleman, Burlingame; Thomas E. Whittaker, San Mateo; David C. W. Yip, Sunnyvale; Mark A. Moore, San Francisco, all of Calif.

[73] Assignee: Sun Microsystems, Inc., Palo Alto, Calif.

[21] Appl. No.: 743,803

[22] Filed: Nov. 5, 1996

[51] Int. Cl.[6] ...................................................... G06F 9/44
[52] U.S. Cl. ........................................... 395/682; 395/701
[58] Field of Search ..................................... 395/701, 710, 395/712, 703, 682, 681, 685

[56] References Cited

U.S. PATENT DOCUMENTS

| | | | |
|---|---|---|---|
| 4,768,150 | 8/1988 | Chang et al. | 395/682 |
| 5,432,935 | 7/1995 | Kato et al. | 395/682 |
| 5,521,849 | 5/1996 | Adelson et al. | 364/570 |
| 5,553,286 | 9/1996 | Lee | 395/705 |
| 5,553,290 | 9/1996 | Calvert et al. | 395/703 |
| 5,557,798 | 9/1996 | Skeen et al. | 395/200.45 |

OTHER PUBLICATIONS

Levendel, Y, "Software Assembly Workbench: how to contruct software like hardware", Proceedings. International Computer Performance and Dependability Symposium. IEEE Comput. Soc. Press. pp. 4–12, 1995.

"Microsoft Windows CE: The New Choice for Dedicated Systems", Microsoft Corp. (May 1997): n. pag. Online. MSDN CD, 1997.

*Primary Examiner*—Dung C. Dinh
*Attorney, Agent, or Firm*—Mark A. Haynes; Wilson, Sonsini, Goodrich & Rosati

[57] ABSTRACT

An architecture for an information appliance adapted for a specific application supports a variety of appliance personalities, relying on a single core technology. The information appliance comprises an application-optimized hardware platform, including a processor, a display coupled to the processor, an input/output device coupled to an information source and to the processor, a user input device, and working memory coupled to the processor. Non-volatile memory is coupled to the processor and stores appliance operating software and application software. The appliance operating software includes logic executed by the processor, which manages information flow from the information source through the working memory to the display, and the application software includes logic executed by the processor and responsive to the user input to manage selection of information from the information source. The appliance operating software includes an operating system kernel that is adapted for the processor, and a system library that includes logic providing an interface to the application software. An operating system service layer provides an abstraction function between the system library and the appliance operating system kernel and hardware, so that the logic in the system library and above, such as in the application itself, is executable with a development platform operating system which is completely different from the operating system of the appliance.

33 Claims, 7 Drawing Sheets

Microfiche Appendix Included
(4 Microfiche, 340 Pages)

12,889,990

INFORMATION APPLIANCE SOFTWARE ARCHITECTURE WITH REPLACEABLE SERVICE MODULE PROVIDING ABSTRACTION FUNCTION BETWEEN SYSTEM LIBRARY AND PLATFORM SPECIFIC OS

REFERENCE TO MICROFICHE APPENDIX

The present specification includes a microfiche appendix under 37 C.F.R. § 1.96(b), having 4 sheets and 340 frames.

LIMITED COPYRIGHT WAIVER

A portion of the disclosure of this patent document contains material to which the claim of copyright protection is made. The copyright owner has no objection to the facsimile reproduction by any person of the patent document or the patent disclosure, as it appears in the U.S. Patent and Trademark Office file or records, but reserves all other rights whatsoever.

BACKGROUND OF THE INVENTION

1. Field of the Invention

The present invention relates to an architecture for development and implementation of easy-to-use, low cost appliances, targeted at connecting average consumers to emerging on-line information services and other information sources.

2. Description of Related Art

Using computers, individuals are able to access a tremendous amount of information. With the emergence of information sources accessible through the Internet, such as web sites in the World Wide Web, and of local information sources, such as CD-ROMS, which are capable of storing entire libraries of information, more and more people are relying on their personal computers as a technique for gathering information. However, personal computers have been designed with general purpose architectures. Therefore, they have a wide variety of resources available in the architecture, which may not be necessary for a given application of the personal computer. The general purpose nature of personal computers keeps the cost of these systems high. Thus, if an individual uses a personal computer only for the purpose of gathering information from a CD-ROM, without taking advantage of a wide variety of other applications for which the personal computer is intended to work, then resources in the personal computer will be wasted.

Thus, it is desirable to provide special purpose platforms for data processing applications, such as retrieving information. However, the development of applications for special purpose platforms is often an intensive design effort. On the other hand, general purpose platforms support mature development tools to make application design efficient.

Thus, it is desirable to provide technology that enables the development and implementation of function-specific software applications that are matched to application optimized hardware platforms.

SUMMARY OF THE INVENTION

According to the present invention, a new class of consumer appliances for homes, schools, and offices is developed which blend the intuitive ease of use, convenience and affordability of consumer appliances with the power of computers having special purpose hardware platforms, in order to make electronic information far more accessible to consumers. Thus, the present invention can be characterized as an architecture for an information appliance adapted for a specific application. The architecture supports a variety of appliance personalities, relying on a single core technology. The core technology is designed to enable development of the appliance architecture software on a general purpose computer, relying on the vast store of software development tools and techniques available for general purpose platforms. A completed function-specific application matched to the application optimized hardware platform for the appliance is thereby provided.

The present invention can also be characterized as an information appliance which comprises an application optimized hardware platform, including a processor, a display coupled to the processor, an input/output device coupled to an information source and to the processor, a user input device, and working memory coupled to the processor. Memory is coupled to the processor and stores appliance operating software and application software. The appliance operating software includes logic executed by the processor, which manages information flow from the information source through the working memory to the display, and the application software includes logic executed by the processor and responsive to the user input to manage selection of information from the information source. The information source comprises in one aspect Internet accessible information, the appliance operating software includes Internet access logic, and the application software includes an Internet browser. In an alternative embodiment, the information source comprises a mass storage device, such as a CD-ROM. In this aspect, the application software comprises a CD-ROM interactive program for retrieving and presenting information on the display to the user. In another embodiment, the information source comprises Internet accessible electronic mail, and the application software includes electronic mail logic.

The display, according to the application optimized hardware, includes one of a variety of monitor technologies, such as standard television monitors (NTSC or PAL), liquid crystal displays (LCDs), and bitmap monitor displays, such as VGA.

The appliance operating software includes an operating system kernel that is adapted for the processor and a system library that includes logic providing an interface to the application software. An operating system service layer provides an application-to-platform abstraction function so that the logic in the system library and above, such as in the application itself, is executable with both the operating system kernel and a development platform operating system which is completely different from the operating system kernel of the appliance. In this way, the application is developed using an application foundation based on the system library, in a development platform, and automatically transferred to an appliance architecture with modification only in the operating system service layer. The only change needed in the code for it to run on a development platform is in the appliance operating system service layer module. The operating system service layer module for the appliance architecture is replaced by a development platform operating system service layer module so that any dissimilarities between the appliance and the development platform are localized at a single module in the code. Accordingly, an application development platform is provided by which a variety of information appliances can be designed on general purpose hardware and implemented on application-specific hardware. This vastly reduces the development time, and the hardware cost for special purpose information appliances, such as web browsers, CD-ROM library browsers, electronic mail appliances, and the like.

In one embodiment, the present invention is characterized as an information appliance which has an appliance hardware architecture that includes at least one input/output device by which information from an information source is provided to the information appliance, a display, a processor, and memory. An appliance operating system software is provided according to the hardware architecture. An appliance program includes logic responsive to user input which manages retrieval of information from the information source and display of the retrieved information. A system library module includes an application interface, memory management resources, process control resources and input/output device call resources. The memory management resources are accessible by the application program through the application interface, and provide management of the memory in the hardware appliance. The memory management resources include information caching logic for information retrieved from the information source. The process control resources are accessible by the application program through the application interface and provide for control of processes used by the application program through the appliance operating system. The input/output call resources are also accessible by the application program through the application interface and provide for communication with input/output devices in the hardware appliance architecture. A device driver library is coupled with the system library module and provides device independent interface logic to the application program which makes input/output calls. An appliance operating system service module is coupled with the system library module and provides an abstraction function between the system library module and the appliance operating system on the appliance hardware architecture, so that the application program, system library module, and device driver library are operable on a variety of operating systems. Thus, the code in the application program that relies on these modules, runs on a development platform in essentially the same way as it runs on the appliance architecture.

The memory management resources, according to another aspect of the present invention, are implemented at the system library level, in order to take advantage of the nature of the special purpose information appliance architecture. Thus, at the system library level, a memory caching algorithm is implemented with least recently used (LRU) memory that allows for management of system memory in the special purpose appliance architecture by software in the application foundation. The caching at the application foundation level takes advantage of the nature of the appliance as a source of information. Because the information sets accessible at web sites and through CD-ROMs and other types of information sources, are generally replaceable, LRU algorithms can be used which discard incoming information to the appliance, without complex management of such information in the application layer code. Again, this greatly reduces the complexity of the application development process, and optimizes the utilization of the hardware resources in the appliance architecture.

The present invention can also be characterized as a method for developing an application program for an information appliance which manages retrieval of information from an information source and display of the retrieved information on the information appliance. The information appliance has an application optimized appliance hardware architecture as described above. The method comprises the steps of providing on a development workstation, a system library module, a device driver library, and an operating system service module of the format discussed above. The operating system service module provides an abstraction function between the system library module and higher layer modules and the development workstation. Next, the method includes developing the application program on the development workstation, using the system library module and the device driver library. Next, the method comprises replacing the operating system service module on the development workstation with an appliance operating system service module, which provides an abstraction function between the system library and the appliance operating system on the appliance hardware architecture. Finally, an executable version of the application program is generated for the appliance operating system on the appliance hardware architecture using the appliance operating system service module.

Accordingly, the appliance architecture of the present invention provides a complete solution to the problem of development of special purpose, low-cost information appliances encompassing hardware, system software, and applications,. The technology enables the creation of a new generation of easy to use low cost appliances targeted at connecting average consumers to emerging information services.

Other aspects and advantages of the present invention can be seen upon review of the figures, the detailed description, and the claims which follow.

DETAILED DESCRIPTION

A detailed description of embodiments of the present invention is provided with respect to the figures.

Figure 1:
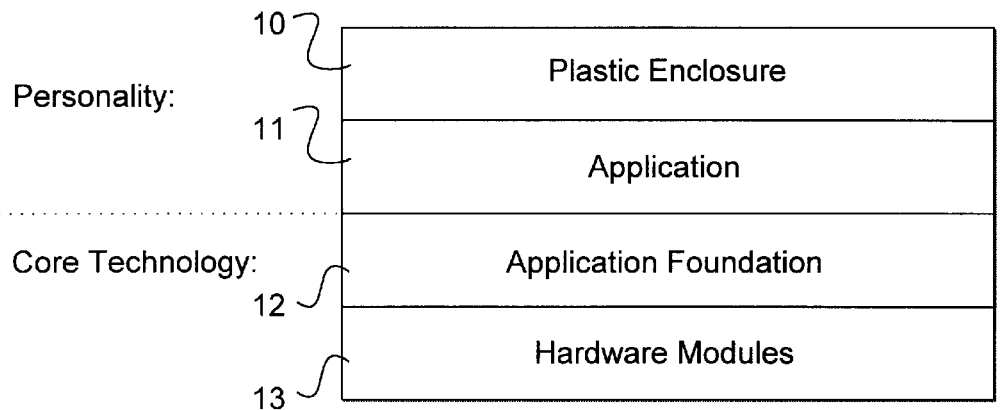
FIG. 1 is a conceptual diagram of the information appliance architecture according to the present invention.

FIG. 1 illustrates the concept of a information appliance architecture, according to the present invention. The architecture provides function-specific software applications that are matched to application-optimized hardware platforms. Rather than focusing on "general purpose", each information appliance is a single purpose computer-like appliance created to deliver a specific application. Because the information appliances are function-specific, each category of a device requires a different combination of hardware and software capabilities as illustrated in FIG. 1. Thus, the personality of the information appliance includes an enclosure, such as a plastic ornamental design appliance enclosure 10, and an application software module 11. The core technology of all information appliances is based on an application foundation 12 and hardware modules 13, which are coupled with the application foundation according to a specific hardware platform.

For example, while one information appliance requires a processor with a high MIPS (million instructions per second) rating, an ISDN connection, and a television output, another appliance requires less computational power, an LCD screen, and a touchpad. Every appliance has the application foundation 12, a central processor, and some amount of memory at the core. However, each individual application varies in the connectivity, output, and user interface appropriate for the application.

In order to easily match different processors with different memory arrangements, different connectivity and different output options, a set of hardware modules is provided. Each appliance is constructed using the hardware modules from the basic design platform. The hardware components used in each design are provided by semiconductor manufacturers in typical systems, to provide I/O devices, processors, memory, and other glue logic necessary for the particular hardware appliance architecture. Hardware logic interface modules are based on a 'busless' design. Rather than create a bus architecture which adds complexity and cost, and inevitably becomes a design bottleneck, low level logic designs are used for interfacing different combinations of microprocessors, memory and I/O devices.

Figure 2:
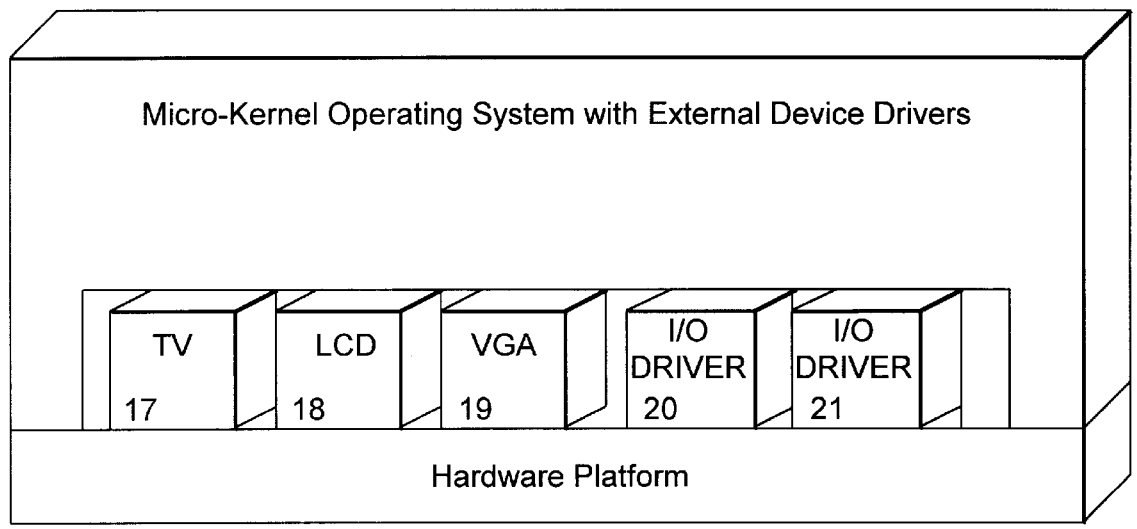
FIG. 2 is a schematic diagram of an appliance board support package, including a client operating system kernel, according to the present invention.

Key to making the modules fit together are external device drivers (EDD) which allow the hardware modules to be directly interfaced with to one another. The EDD's are controlled and managed by the operating system, and interface with the hardware to the application foundation software. The integration of the EDD's with an operating system forms a complete board support package (BSP), as illustrated in FIG. 2. Thus, the BSP includes a hardware platform 15, and a microkernel operating system 16 with external device drivers, such as a television driver 17, a liquid crystal display (LCD) driver 18, a VGA graphics driver for a computer monitor 19, and generic I/O drivers 20 and 21, such as used for accessing the Internet, CD-ROM drives, or other sources of information.

Figure 3:
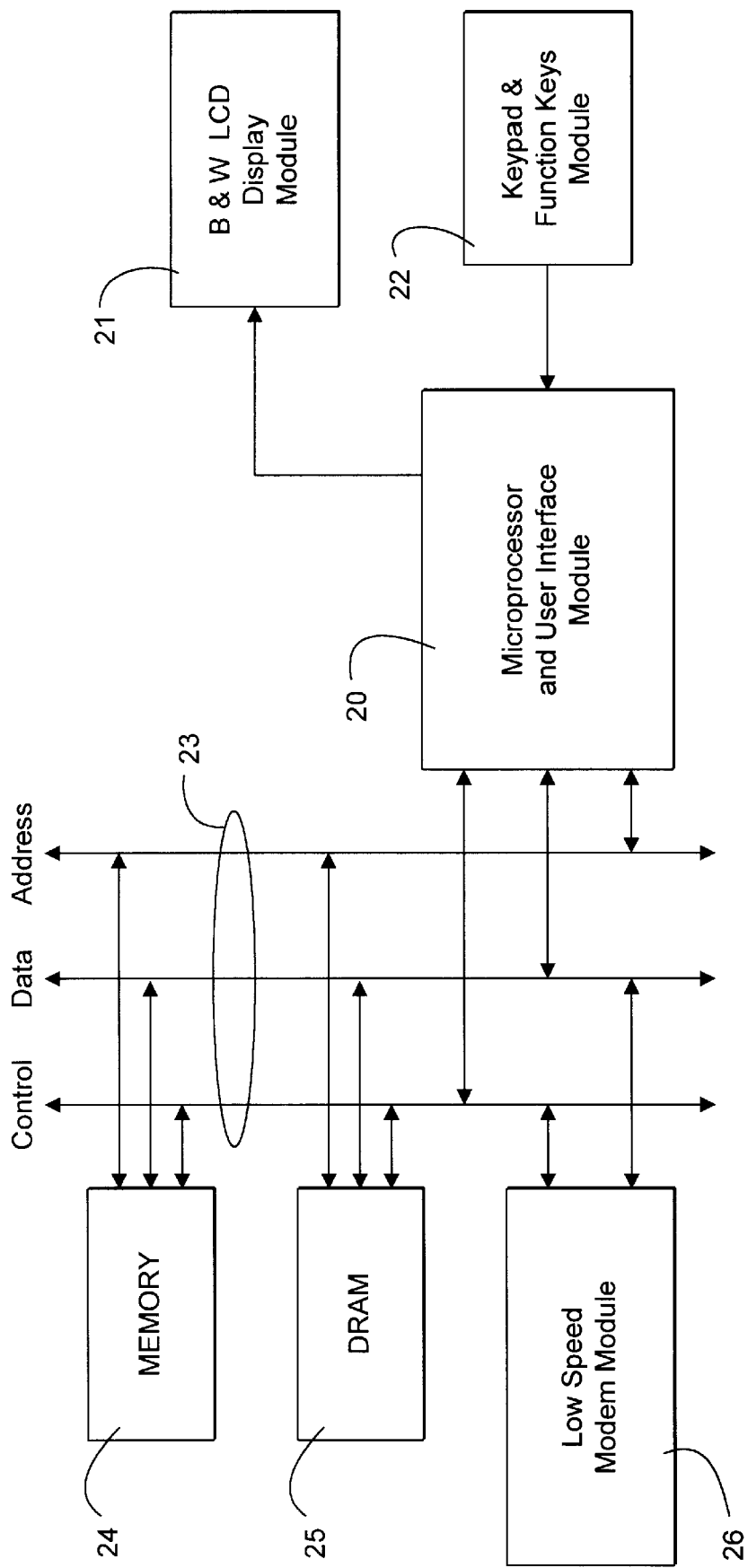
FIG. 3 is an example of a hardware platform for an electronic mail appliance.
Figure 4:
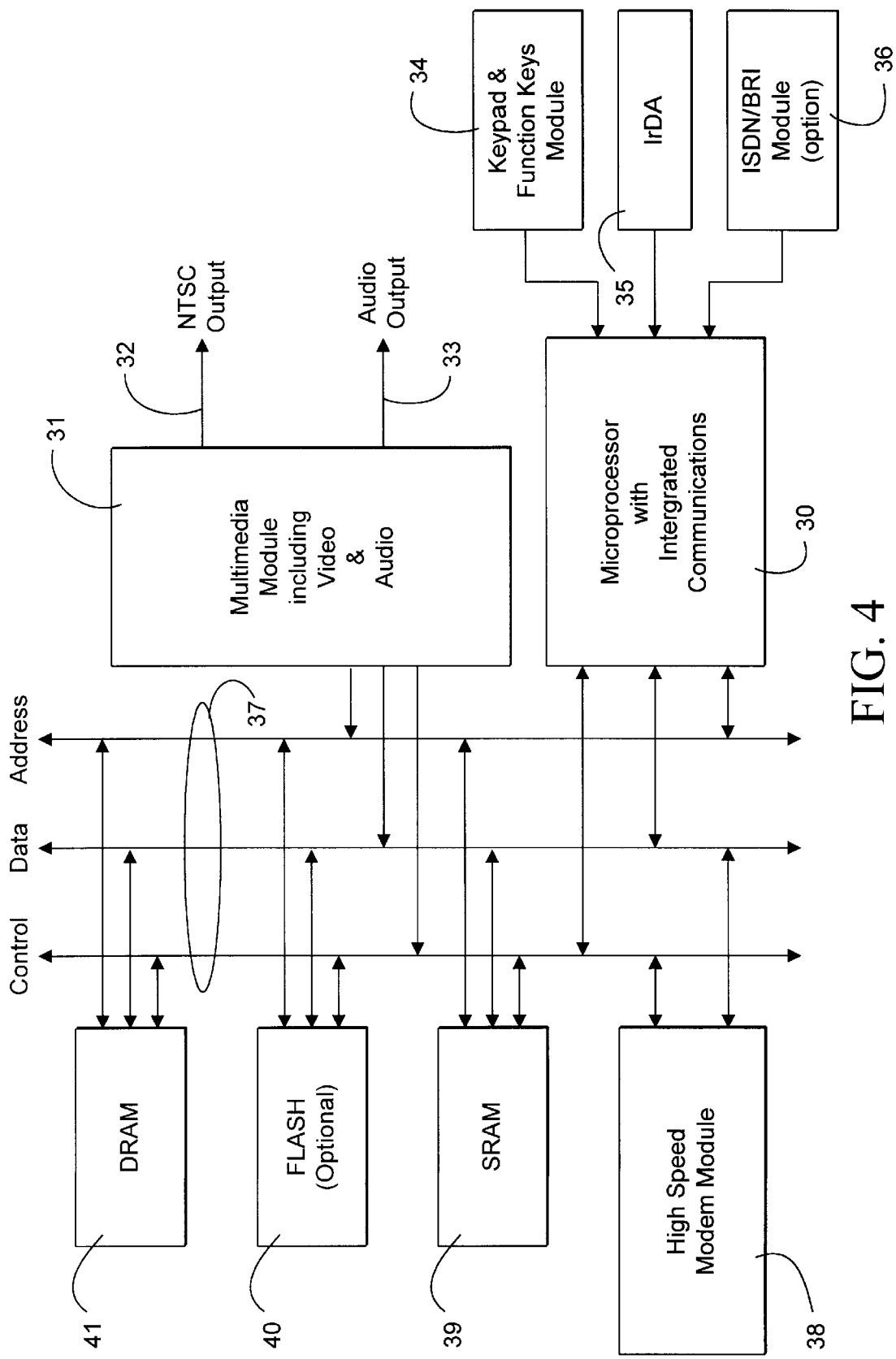
FIG. 4 is an example of a hardware platform for an Internet appliance.

FIGS. 3 and 4 provide examples of hardware architectures for information appliances according to the present invention. In FIG. 3, an example platform for an electronic mail appliance is shown. The platform implements a fully functional email application on a low cost, small footprint device. It incorporates a moderate performance processor, in the microprocessor and user interface module 20, coupled with a black and white LCD display and display module 21. A keypad and function keys module 22 is coupled with the microprocessor 20 to provide user input. Control, address, and data lines 23 are coupled to a memory 24, such as SRAM or a flash memory, a working memory 25, such as DRAM memory, and an I/O module, such as a low speed modem module 26.

FIG. 4 provides an example Internet platform built to implement a fully functional web browser application on a moderate cost, small footprint device. The platform provides a high performance processor in a microprocessor with integrated communications module 30. A NTSC television output is generated in a multimedia module that includes video and audio support hardware 31. Thus, the multimedia module 31 generates NTSC output on line 32 and audio output on line 33. A keypad and function key module 34 is used to provide user input. Also, an infrared remote control device adapter 35 allows user input across an IR handheld remote. An optional high speed networking protocol module, such as an ISDN/BRI module 36, may be included with the system. Control, data, and address lines 37 are coupled to the multimedia module 31 and the microprocessor 30. These provide connection to a high speed modem module 38, working memory 39, optionally non-volatile memory 40, and high speed dynamic random access memory (DRAM) 41, for use in the browsing application.

Additional platforms can be assembled readily using different combinations of hardware modules and processors. The application foundation architecture, according to the present invention, is completely hardware independent, so any change to the hardware requires only simple changes to the board support package that do not propagate up through the application software.

Figure 5:
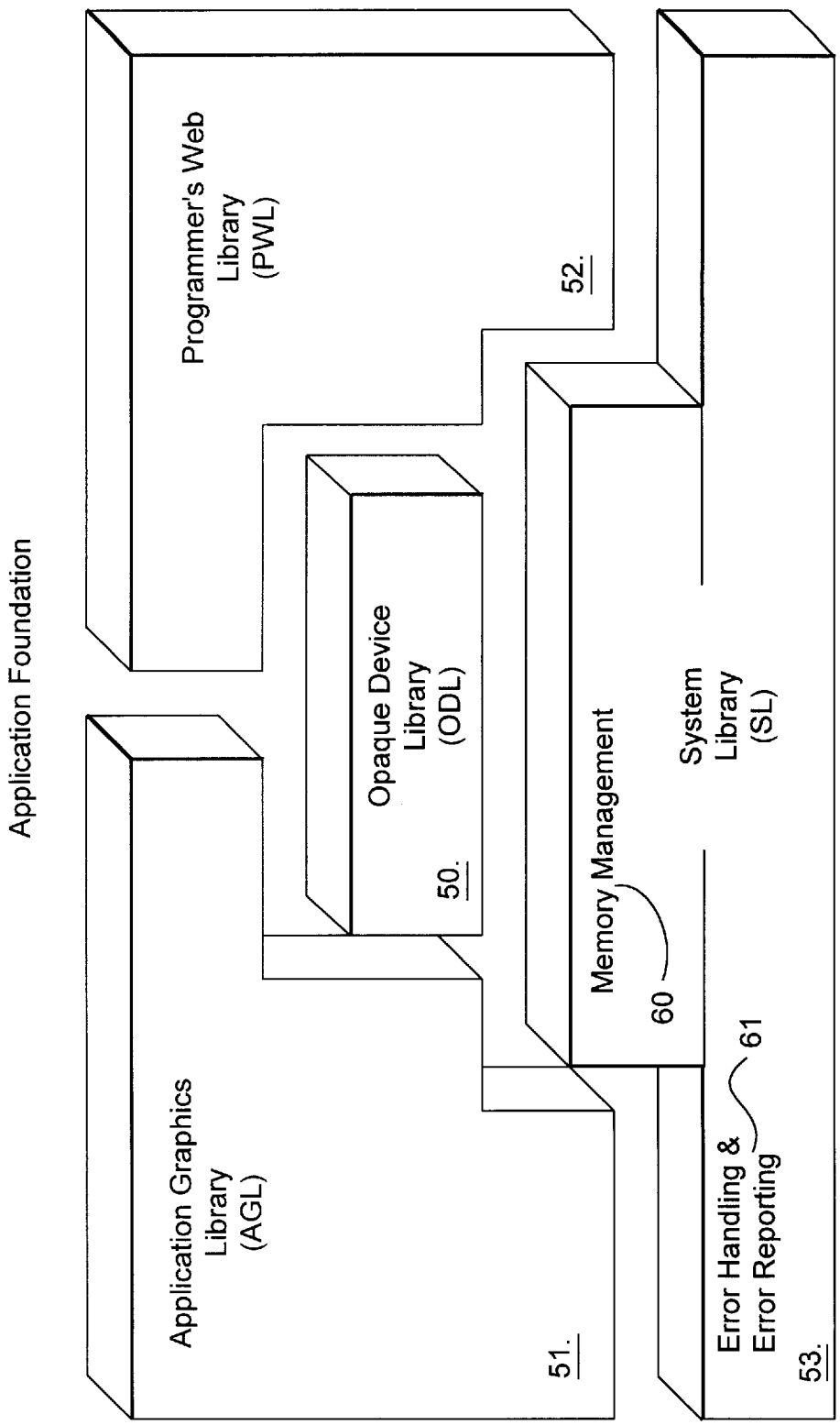
FIG. 5 is a simplified diagram of application foundation software for use with the board support package of FIG. 2.

FIG. 5 illustrates the application foundation, the first platform designed for the creation of information appliances. The application foundation is small, in the neighborhood of 300K bytes, and has been optimized to be both high performance and robust enough to support any information appliance software application. Further, since each application will require its own optimized hardware, the environment is portable, to allow the developer to move from one platform to another.

The application foundation is primarily composed of the opaque device library (ODL) 50, the application graphics library (AGL) 51, the programmer's web library (PWL) 52, and the system library (SL) 53, and supported by an operating system services layer that provides an application foundation to platform abstraction function.

Opaque Device Library (ODL) 50

The opaque device library (ODL) 50 is the interface used for interacting with external device drivers. ODL 50 is a single 'file-like' interface which provides a powerful mechanism for dealing with any communications, input or storage device. All devices are accessed using the same interface and therefore can be swapped without any need to alter the application code, allowing ODL 50. programmers to substitute devices seamlessly.

The preferred implementation of the ODL 50 supports the following devices, with more used in alternative embodiments:

Network connections (POTS, ISDN, TI, E1, Ethernet, broadband, wireless)

Input devices (keyboard, mouse, IR remote control, touchscreen)

Storage devices (CD-ROM, Hard Drive, Floppy Drive, Flash memory devices, IrDA, PCMCIA)

Application Graphics Library (AGL) 51

The application graphics library (AGL) 51 is the interface used for drawing and displaying images. The AGL 51 is designed to support a variety of display devices including VGA, LCD, TV (NTSC and PAL) and even aspects of other display peripherals such as LCD touchscreens. The primary components of the AGL are a 2D drawing package, an image drawing package, support for GIF and JPEG images (progressive and non-progressive), plus windowing and cursor control.

AGL 51 can be configured to support any display type when the application is linked. The link-time configuring of AGL 51 exchanges information with the low level graphics EDD for the display device selected. The EDD gives AGL 51 added information about the display environment, allowing AGL 51 to optimize the output for the best possible appearance. All enhancements delivered by AGL 51 appear without changes to the application graphics or programmable interfaces. Only the screen size and font size need to be adjusted in the application.

Programmer's Web Library (PWL) 52

Almost every application developed can benefit from access to World Wide Web content. The programmer's web library (PWL) 52 gives the application programmer a tool kit for parsing URLs and making HTTP requests. PWL 52 will also parse HTML content and return the 'marks' back to the application program. The application program is only responsible for properly formatting and displaying the content. Note, all HTTP requests are made via ODL 50, so content can be accessed whether it is stored locally (for example on a CD-ROM) or on remote server (via a network connection).

System Library (SL) 53

The System Library (SL) 53 provides the application program with system infrastructure support. Two primary support functions provided by SL 53 are memory management 60 and error handling 61.

Memory Management 60: Typical appliances are required to operate with tight memory since most devices will have limited physical memory and no virtual paging. SL 53 handles memory fragmentation, removes items from memory that are no longer needed, and enables the application to recreate or reload segments.

The memory management component 60 of the application foundation is constructed around 3 categories of memory:

System memory, which is for data which is permanent or data that has a long lifetime.

Program memory, which can be categorized as relocatable or non-relocatable and is data that may come and go as the application executes.

LRU memory, which is data that can be recreated or reloaded at any time.

By classifying memory according to these categories, different algorithms can be applied to keep memory compact, allowing for full optimization of memory resources. (See FIG. 9) All elements in the application environment (AGL, PWL, ODL, etc.) utilize the memory management component.

Error Handling 61: There are two basic error mechanisms included in the development environment—user errors and system exceptions.

User errors are handled by a 'catch and throw' error mechanism and allow the application to display an error message using Unicode error messages.

System exceptions are unexpected program errors. Program errors are specified using a number and can be displayed using special error formatting routines. The error formatting routines use a Unicode version of the error messages.

All error messages can be translated to any language, and are loaded into the application at build time.

Figure 6:
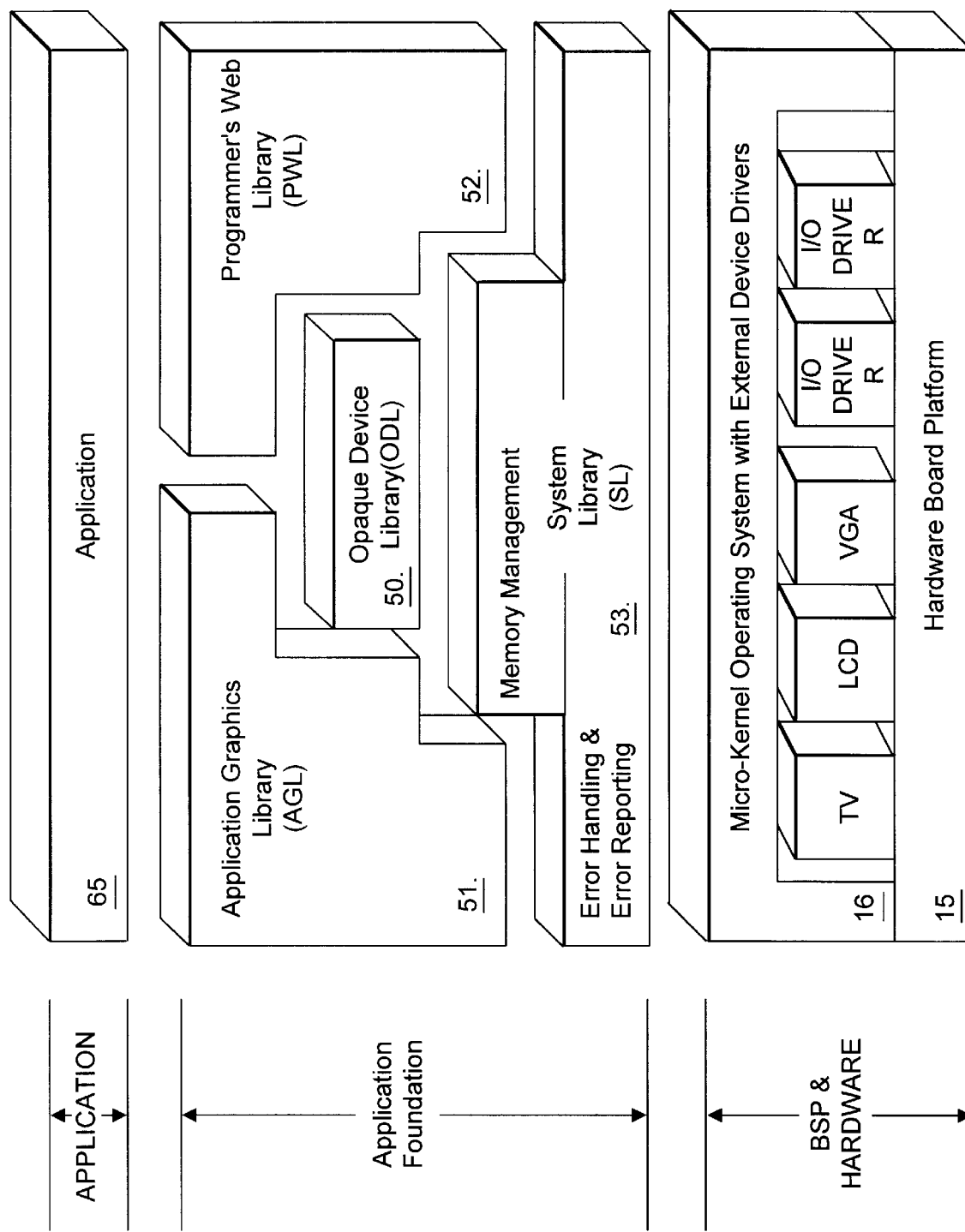
FIG. 6 is a simplified diagram of a complete information appliance architecture according to the present invention.

FIG. 6 provides a summary view of the complete information appliance architecture including hardware, system software, and applications. The reference numbers used in FIG. 6 are the same as those used in FIGS. 2 and 5. An information appliance application 65 sits on top of the foundation to provide a completed information appliance.

Figure 7:
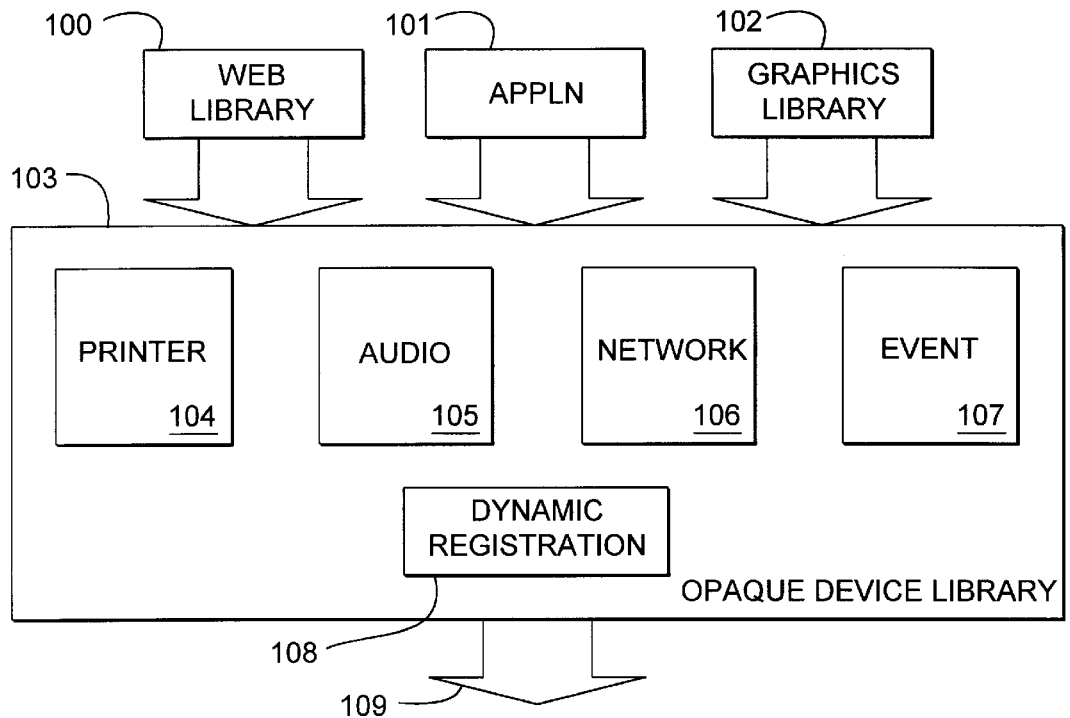
FIG. 7 is a diagram of the opaque device library (ODL) layer of the application foundation of the present invention.

FIG. 7 provides a simplified diagram of the ODL 50 layer of the present invention. The ODL is coupled to the web library 100, the application program 101 for this specific appliance and the graphics library 102. The ODL 103 includes printer functions, audio functions, network functions, event functions, and other device-type modules to provide a unified interface to the application program for the devices. Also the ODL 103 includes dynamic registration functions so that the application layer 101 is provided an interface to any device, like a network interface, a display, a sound chip, or a touch screen through a common interface. The ODL 103 is coupled as indicated at 101 to operating system-specific functions in the operating system service layer, as discussed below, and to the operating system, as suits the particular function being executed. Also, it is supported by the system library, shown in FIG. 8.

The event component 107, for example, includes an event directory that includes an event data file. Blocking or non-blocking functions are utilized for reading the event file. The application layer 101 is able to read the event data file, either with a blocking or non-blocking function. If the application, for example, has nothing to do except wait for an event, then it will do a blocking read and wait for the event. Otherwise, non-blocking reads can be utilized. The blocking read to the event data file is based on an operating system service layer queue function in order to save processing cycles and provide efficient blocking functions.

The network component 106 is based on a network directory which the application is capable of reading and writing to. Through the network block 106, the application program is provided an interface to the actual I/O device driver at lower layers of the design.

Similarly, the audio component 105 provides a unified interface for the application program 101 for various types of audio files, such as "wave files" and other standard files, such as aiff files and the like.

A printer component 104 and other files, such as scanners, touch-screens, and the like, can be added to the ODL 100, as suits the particular implementation of the invention. The ODL 103 provides a unified set of functions by which the application 101 is capable of opening the file and performing read and write operations to the devices on the appliance hardware platform, while being isolated from the actual device drivers by means of the unified ODL layer 103. For the network module 106, for example, ODL functions include a command for opening a network connection, and providing a pipe from the application to the network interface driver. For the audio file 105, the ODL 103 includes functions which detect file type for the audio data, and to play the file.

Thus, the ODL provides an interface for interacting with I/O devices. The ODL is a single file-like interface which provides a powerful mechanism for dealing with devices. All devices are accessed using the same paradigm and therefore, can be swapped without application code requiring significant change. For instance, a modem can exchanged with a CD-ROM device and the application would not have to change. Normally, this would require code being changed for a protocol, like TCP/IP, to a series of system calls.

The standard interface to all these devices is file-like. There is directory hierarchy that represents all the available resources to an application. At run time, an application can traverse through the directory tree to see what resources it has available to it. Using simple file open read, read/write, and close calls, an application can accomplish all its I/O requirements. The information that is written or read from the files is device-type independent, in order to meet the requirements of supporting a wide range of devices.

The ODL is also integrated with application's graphics library, to provide asynchronous image display, that is displaying of an image while it's being downloaded.

In one embodiment, the ODL system is based on a file descriptor table that stores all file-specific data types and state information. Read, write, open, close, and flush operations are performed by file-type specific routines, for which there is a function pointer to the file descriptor table. Events are handled in an event table in the ODL, providing one file where user events are found. In order to receive user input, an application must open the data file in the events directory and perform read operations on that file. The data file is a read-only file containing user events ranging from input from an infrared remote to a standard keyboard input. This file is read-only because user events are strictly an input to the system.

To access the ODL, the application program uses functions including, for example, the following:

OPEN

Syntax: sword odlOpen(char * sourcePath, ub4 access);

Function: This function is used to open an odl file. A call to odlOpen will perform the following operations:
1. Verify that the file trying to be opened is a valid resource.
2. Verify that the resource is available.
3. Get the next free entry into the odlFDT.
4. Call the corresponding open routine for the device.
5. Store device specific function pointers, device fd, and status info in FDT.

Input: sourcePath—User supplied path to file to open.
  ub2—Access privileges to file such as read, write, read and write, etc.
Output: None
Return: A positive number will indicate successful completion of the call and will be the file descriptor for accessing the open file. A negative number will indicate an error code.

CLOSE

Syntax: sword odlClose (uword fd);

Function: This function is used to close an odl file. A call to odlClose will perform the following operations:
1. Verify that the fd is valid.
2. Call the close function that is referenced in the FDT for this entry. The fd will be replaced with the fd found in the main FDT for this instance of this device.
3. Return the return code that was returned from call to device specific flush operation.

Input: fd—File descriptor of file to be closed.
Output: None
Return: A "0" is returned if successful. A negative error code is returned if not successful.

READ

Syntax: sword odlRead (uword fd, void * buf, uword n, uword * flag);

Function: This function is used to read from an odl file. A call to odlRead will perform the following operations:
1. Verify that the fd is valid.
Verify that the file is readable.
Call the read function that is referenced in the FDT for this entry with the buffer and size passed in by the calling procedure. The fd will be replaced with the fd found in the main FDT for this instance of this device.

Input: fd—File descriptor of file to be read.
  buf—User provided ptr to buffer for data to be transferred into.
  n—Maximum number of bytes to be read.
  flag—Set to null if caller function does not want this variable set to done when operation is complete. Otherwise, points to valid uword indicating this variable should be updated on job completion. Only supported by certain file types.
Output: buf—Contains data read from file.
Return: Zero indicates that file is empty. A positive number represents number of bytes put in buf. A negative number indicates an error and represents an odl error code.

WRITE

Syntax: sword odlWrite (uword fd, const void * buf, uword n, uword * flag);

Function: Write to an odl file. A call to odlWrite will perform the following operations:
1. Verify that the fd is valid.
2. Verify that the file is writeable.
3. Call the write function that is referenced in the FDT for this entry with the buffer and size passed in by the calling procedure. The fd will be replaced with the fd found in the main FDT for this instance of this device.
4. Return the return code that was returned from call to device specific write operation.

Input: fd—File descriptor of file to be written.
  buf—User provided ptr to buffer of data to be written to file.
  n—Number of bytes to be written to file.
  flag—Set to null if caller function does not want this var set to done when operation is complete. Otherwise, points to valid uword indicating this var should be updated on job completion. Only supported by certain file types.
Output: None
Return: A positive number indicates number of bytes written to file. Negative numbers indicate an error and represent an odl error code.

WAIT

Syntax: sword odlWait (uword fd, const void * buf, uword n, uword timeOut);

Function: Wait for an I/O access. This function provides a means for the calling process to block on I/O read operations. A call to odlWait will perform the following operations:
1. Verify that the fd is valid.
2. Verify that the file is readable.
3. Call the Wait function that is reference in the FDT for this entry. The fd will be replaced with the fd found in the main FDT for this instance of this device.
4. Return the return code that was returned from the call to device specific wait operation.

Input: fd—File descriptor of file to be read.
  buf—User provided ptr to buffer for data to be transferred into.
  n—Maximum number of bytes to be read.
  timeout—Time out value specified in milliseconds. If set to 0 indicates to block until read is complete.
Output: Buf—Contains read data unless function timed out.
Return: Positive number indicates data read in bytes. Zero indicates function timed out. Negative number indicates error.

FLUSH

Syntax: sword odlFlush (uword fd);

Function: This function flushes any buffered input or output. A call to odlFlush will perform the following operations:
1. Verify that the fd is valid.
2. Call the flush function that is referenced in the FDT for this entry with the buffer and size passed in by the calling procedure. The fd will be replaced with the fd found in the main FDT for this instance of this device.

3. Return the return code that was returned from call to device specific flush operation.

Input: fd—File descriptor to be flushed.
Output: None
Return: Zero on success or a negative error code if unsuccessful.
INIT
Syntax: sword odlInit(void);
Function: Used to initialize library before applications start making calls to the odl.
Input: None
Output: None
Return: Zero on success or a negative error code if unsuccessful.
SHUTDOWN
Syntax: sword oldShutdown(void);
Function: Used to clean up resources created in odlInit.
Input: None
Output: None
Return: Zero success or a negative error code if unsuccessful.

Figure 8:
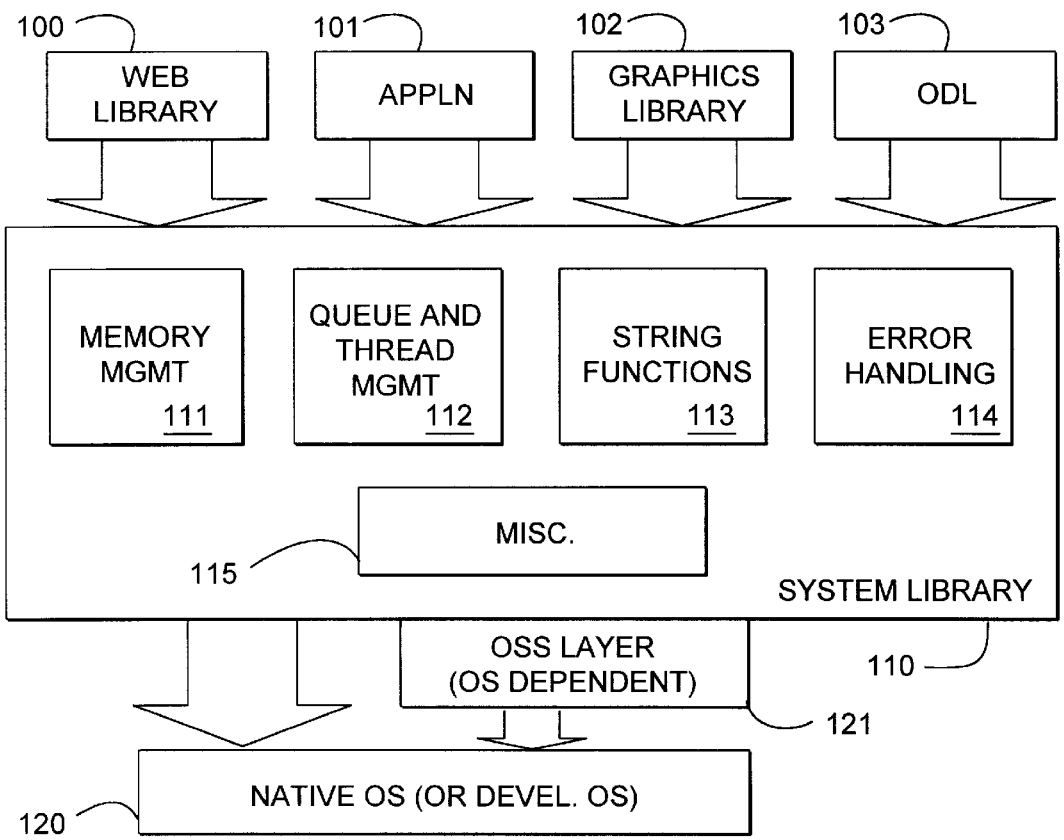
FIG. 8 is a simplified diagram of the system library layer of the application foundation of the present invention.

FIG. 8 provides a simplified diagram of the system library 110, according to the present invention. System library 110 is used in conjunction with the web library 100, the application 101, the graphics library 102, and the ODL 103. The system library 110 includes memory management functions 111, queue and thread management functions 112, string functions 113, and error handling processes 114. Also, miscellaneous items 115 are included in the system library 110. System library 110 is coupled with a native operating system 120 and an operating system support layer 121. The native operating system 120 may be replaced by a development operating system, as mentioned above, for use during application development on a general purpose workstation. The native operating system consists of a standard kernel system, like pSOS, or alternatively a special purpose kernel for the hardware platform being utilized. A development operating system can be any one of a variety of systems, including UNIX-type systems, and windows-type systems.

The OSS layer 121 provides an abstraction function for taking care of the operating system dependent operations for the system library layer and layers above the operating system 120. The OSS layer 121 includes items like data-type specifications, network port functions, flash memory code, domain name server (DNS) functions, and the like.

The system library 110 is static from platform to platform. It provides threading functions, such as functions used to create and delete threads. It provides registration functions that allow the higher layer modules, such as the AGL 51, to register with system library 110 and keep pointers to registered applications.

The memory management function 111 provides for management of the flow of data from the information source to the application program. It includes caching functions and the like, as mentioned above. The queue and threading management functions 112 provide for registration of applications with the threads, context registry, and a notification function. The error handling functions 114 provide for exception handling in a manner similar to the C++ exception handling processes known in the art. Thus, catch and throw error handling routines set up a try region and a catch region in memory.

The string functions 113 are set up to handle classic string processes for development of computer programs. Other miscellaneous functions are handled in the system library 110, which are necessary to support a robust application foundation.

Appendix I provides source code for one embodiment of the system library, according to the present invention.

As mentioned above, the system library includes memory management functions. By consolidating memory management functions at the system library level, development of applications for special purpose platforms is greatly facilitated. Furthermore, to manage small memory resources, which the typical information appliance manages, an efficient and unified memory management function is required.

The OSS layer 121 provides an abstraction function between the system library, in the higher level modules, such as the web library 100, application 101, graphics library 102, and ODL 103, and the native operating system and platform of the appliance. The abstraction layer localizes the operating system and platform dependent parameters and functions in the code, in order to move the application foundation from a development platform, such as a high end workstation running a robust full-function operating system, to the application-specific platform of the appliance. The only changes that need to be made occur in the OSS layer 121.

Appendix II provides an example OSS layer for the kernel operating system pSOS. Appendix III provides an example OSS layer for a general purpose operating system, such as LINUX UNIX. Other high function, general purpose system may be used, like Sun Solaris, UNIX, or Windows NT. As can be seen, the system library, web library, application, graphics library, opaque device library, and other modules developed on the application foundation, can be moved from a development platform to an application optimized platform without modification, because of the abstraction function provided by the OSS layer.

Figure 9:
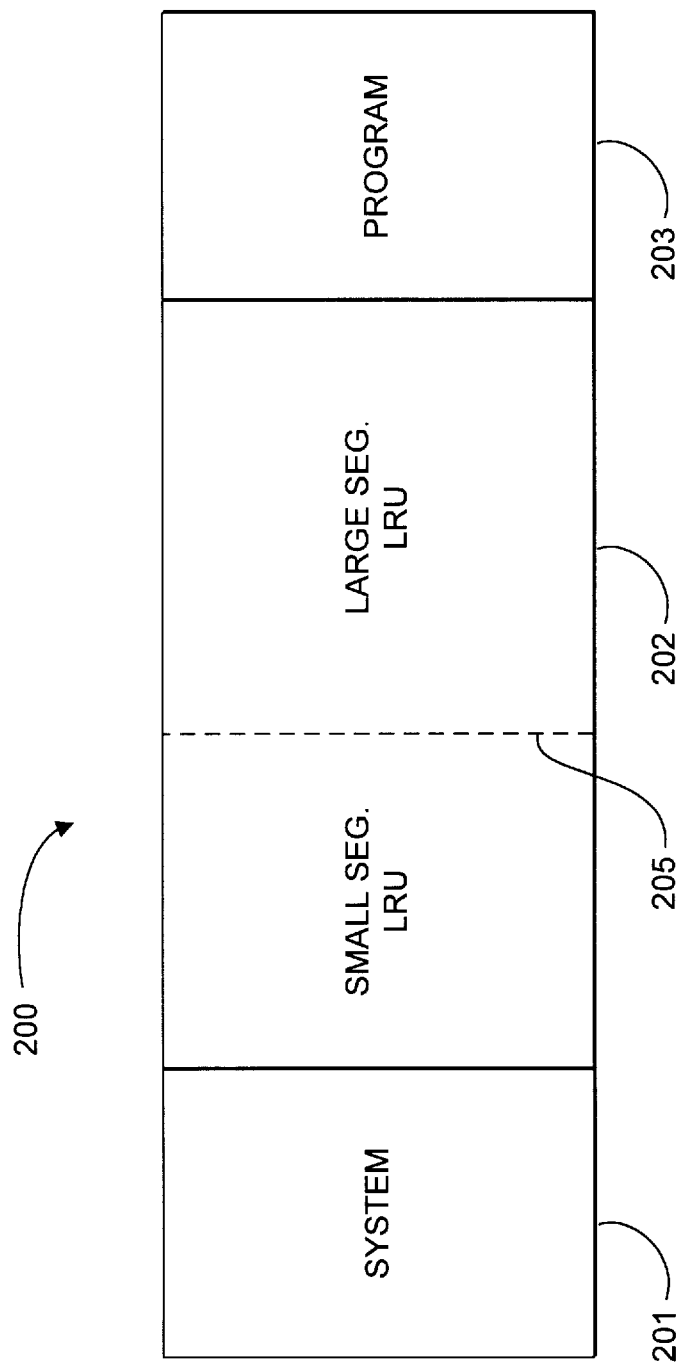
FIG. 9 is a simplified memory organization diagram for the memory management software according to the present invention.

FIG. 9 illustrates a memory map for a section of memory 200, which is under the control of the memory management function. The memory 200 includes a system heap 201, a program heap 203, and a least recently used (LRU) heap 202. System heap 201 is used for memory allocated once and which must remain in existence for long periods of time. Memory from system heap 201 is considered permanent and used for data to be freed under very rare circumstances. Allocation of system heap memory is fast and efficient in packing memory. To free or reallocate memory in system heap 200 is expensive and fragmentation may be occur quickly if the memory is often reallocated. The system heap 201 takes priority over program heap 203 and LRU heap 202 and if required, will grow by taking memory from the LRU heap and program heap. Program heap 203 is used for memory needed for relatively short periods of time, which may be reallocated and freed on a regular basis. Allocation of memory in program heap 203 is more expensive than in system heap 201 and allocations will occupy more space for bookkeeping purposes. Allocations to program heap 203 are required to be moveable, and are based on a handled memory technique. During the allocation and reallocation process, only handles are returned and used by the application for accessing the allocated memory. All accesses to the memory are made via the handle, since the allocation can be relocated at any time. Freeing memory and reallocating memory in this space are not a problem and fragmentation is minimized. Program heap 203 takes priority over LRU 202 heap, and will grow by taking memory from LRU heap 202.

LRU heap 202 is used for data which can be lost by the application program without catastrophic results. Thus, memory retrieved from the web or other information source, which can be retrieved again, is suitable for use in LRU heap 202. In other words, things allocated to LRU heap 202 are expendable and may be freed by the system at any time independent of the application. Accesses to the memory within LRU heap 202 are performed via a handle. The handle contains the current address of the storage after the memory has been pinned. If allocation is pinned, then it is guaranteed that the memory will not be freed or reallocated. Memory is recycled based on a LRU basis for each priority of memory. For instance, the oldest memory allocated with a priority low is generally freed before any memory allocated at priority medium.

In the preferred embodiment, LRU heap 202 includes a segment for small data elements, such as text, and a segment for large data element, such as graphics pages from world wide websites. These portions of the LRU heap 202 are separated from a boundary 205. Boundary 205 has a fixed position relative to the width of LRU heap 202 in one embodiment. In an alternative embodiment, boundary 205 is dynamically altered depending on the dynamics of the traffic using LRU heap 202.

To use the memory manager in the system library, the application calls functions include the following:

SysAlloc
Syntax: void * dslmemSysAlloc (ub4 size, ub4 flags, char *comment);
Function: Allocate "permanent" memory from the System Heap. This will keep critical memory sections separate from the application space.
Input: size—size of allocation
  flags—SLMEMCLR if memory should be cleared
  comment—up to 8 chars, describing allocation (null term)
Output: None
Return: Pointer to memory allocated, null if out of memory.

SysFree
Syntax: sword slmemSysFree (void *mem,char *comment);
Name: MEM System Heap Free
Function: Free memory allocated by memSysAlloc. After this operation, *mem is no longer accessible.
Input: mem—pointer to the memory allocate
  comment—should be same when allocated, can be null
Output: None
Return: 0 if no error, error code otherwise PgmAlloc
Syntax: slmemPgmAlloc(ub4 size, ub4 flags, char *comment);
Name: MEM Program Handled Allocate
Function: Allocate memory from the Program Heap, memory must be accessed via the returned handle.
Input: size—size of allocation
  flags—see above
  comment—up to 8 chars, describing allocation (null term)
Output: None
Return: Handle to memory allocated, null if out of memory.

PgmRealloc
Syntax: slmemHandle slmemPgmRealloc( ub4 size, slmemHandle *h, char *comment);
Name: MEM Program Handle'ed Reallocate
Function: Reallocate space that was previously allocated using PgmAlloc. If size is 0, memory is freed. If size is larger than previously, the contents are copied to the new allocation with the added area nulled out. If the size is smaller, then the contents are copied and truncated.
Input: size—new size of allocation
  h—handle to the current allocation
  comment—should be same when allocated, can be null
Output: None
Return: Handle to memory allocated, null if out of memory
[NOTE: If out of memory condition occurs, then the old memory location is still valid with memory contents intact.]

PgmFree
Syntax: sword slmemPgmFree( slmemHandle *h, char *comment);
Name: MEM Program Handle'ed Free
Function: Free memory allocated by slmemPgmAlloc. After the free, **handle is no longer accessible. The handle is also freed by this operation so no explicit free is required on the handle and the handle can no longer be used.
Input: h—handle of the pointer to the memory allocated
  comment—should be same when allocated, can be null
Output: None
Return: None LruAlloc
Syntax: slmemLruAlloc( ub4 size, slLruPriority priority, ub4 flags, char *comment);
Name: MEM LRU Heap Allocate
Function: Allocate memory from the LRU heap. Note, memory must be relocatable (i.e. no pointers referencing the contents or self-referential pointers) and must be free-able by the system when not pinned. The returned handle is for memory already pinned and accessible.
Input: size—size of allocation
  priority—one of slLruPriority
  flags—
  comment—up to 8 chars, describing allocation (null term)
Output: None
Return: Handle to pinned memory, null if out of memory.

LruPin
Syntax: sword slmemLruPin(slmemhandle *h);
Name: MEM LRU Pin in a memory allocation
Function: Pins memory previously allocated and if successful returns a valid pointer to the memory in the handle. This operation can be performed more than once without a LruRelease occurring and no harm is done.
Input: h—valid pointer to a handle returned by LruAlloc
Output: None
Return: 0 if successful, error if not LruRelease
Syntax: sword slmenLruRelease(slmemHandle *h);
Name: MEM LRU Release a memory allocation
Function: Unpins memory previously allocated by LruAlloc and if successful nulls out the memory pointer within the handle. This operation can be performed more than once without a LruPin occurring and no harm is done.
Input: handle—a valid pointer to a handle returned by LruAlloc
Output: None
Return: 0 if successful, error if not LruFree
Syntax: sword slmemLruFree(slmemhandle *h, char *comment);
Name: MEM LRU Free
Function: Free memory and handle allocated by slmemLruAlloc. After freeing, handle pointer is no longer valid as well as the memory pointed to by the handle. The handle may be pinned or unpinned.
Input: h—a valid pointer to handle returned by LruAlloc
  comment—should be same when allocated, can be null
Output: None
Return: 0 if successful, error if not Init
Syntax: sword slmemInit(size_t memAvail, ub4 handles, ub4 flags);
Name: MEM Initialize
Function: Initialize the memory manager. Must be called before any mem functions are called.
Input: memAvail—if 0 use oss call to find amount of memory on device, otherwise memAvail is number of K bytes available for use by mem.

Output: None
Return: 1—fatal initialization error,
    0—otherwise
HeapDump
Syntax: void slmemHeapDump(sword heap, sword level);
Name: MEM Dump Heaps
Function: Dumps information about heaps to stdout. This routine should be callable from the debugger so don't add any arguments that are hard to specify.
Input: heap—which heap to dump
    level—level to dump (0=minimal, 99=all)
Output: None
Return: None Thus, in the memory management module of the SL, the memory allocated to the system is divided up into three heaps. A heap is essentially a section of memory which is subdivided into smaller allocation units which can be allocated and deallocated in any order. The small allocation units are called pages. The size of a page is dependent on the operating system and the underlying hardware and is defined by constant OSSMEMPAGSZ. In one particular example, OSSMEMPAGSZ is set to 4K (4096) bytes. The heaps are typically implemented as a doubly-linked list of page records with additional information in each page record indicating how much of the page is allocated and an allocation list for the memory contained within the page. In addition, there are various pointers that are used for traversing the list. The three heaps used are the SYS heap, initially set to 300 pages, the PGM heap, initially set to 500 pages and the LRU heap, initially set to 300 pages. The LRU heap is treated by the system as two separate heaps: the small LRU heap and the large LRU heap. Allocations of memory chunks exceeding one page size, in this case, exceeding 4K, are done from the large LRU heap. Allocations of memory sections smaller than or equal to 4K are satisfied out of the small LRU heap. The two subheaps then grow towards each other until the LRU heap is exhausted.

The SL commands include extended service routines for memory management. Using SL calls, pages can be allocated, freed, or reallocated within any heap. Each heap has its own specific SL routines for allocating and freeing pages. The SL page allocation routines returns a handle to the calling program which can be used to address that particular page.

System routines and application programs allocate memory in a heap by calling the SL allocation routine for that heap. For example, in the SYS heap, memory allocation is handled by a routine called SYSALLOC. The calling program provides SYSALLOC with the size of the memory segment required and control flags. SYSALLOC deals with allocating new pages, or using existing pages when appropriate, and returns the address of a data structure located in the requested heap and having the amount of storage requested by the calling program. Note that the calling program is not directly involved with managing pages. Other heaps have similar routines for performing the same function. Additional SL routines deal with scanning each heap for unused sections of memory and performing garbage collection when necessary to consolidate unused memory sections into larger sections, concatenating used memory sections, when possible, and maintaining the data structure that indicate which section of each page is in use.

The system is designed to work in both single and multi-tasking environments. When working in a multi-tasking environment, the memory routines lock the global context which prevents other threads requesting memory allocation or deallocation services while a request is being processed. Once the memory operation is completed, the global context is unlocked.

The application kernel also provides various SL routines for scanning and validating the allocations to guard against accidental corruption of the information stored in the various memory locations addressed by the handles used by the application program.

Each heap also has a SL reallocation routine that resizes an existing allocation by either reducing or increasing the size of the memory segment associated with that the allocation. Reallocation may be used to accommodate a smaller amount of storage by freeing unused memory, or more challengingly, to increase the size of an existing allocation. The reallocation routines can allocate additional memory on the same page as the existing allocation. If sufficient free memory is not available on the current page, additional pages may be allocated to accommodate the request for additional memory for a particular allocation. This allows the size of individual allocation to be dynamically adjusted as the application program requires without having to delete the contents, allocating a new memory section and copying the values from the old section to the new section.

The SL routines that provide page operations also provide the ability to dynamically resize the heaps when the number of free pages in that heap falls below a threshold. This is called "Stealing Pages". The page stealing or dynamic reallocation basically involves adjusting the starting point of a heap that is running low on free pages such that certain number of free pages from the end of one heap is transferred to the beginning of the next. For example, when the SYS heap is running low, pages can be stolen from the LRU heap. The routine that performs this operation is PAGESTEAL and it performs the appropriate checks to make sure that the pages that are being stolen are not already in use and to make all the appropriate adjustments to pointers such that the memory handles used by the application programs will continue to point to the correct data in the appropriate place in memory. Likewise, the PGM heap can steal pages from the large LRU using the same procedure and making the appropriate adjustments. The page stealing operation for the PGM heap is also done by the above mentioned routine.

In summary, the information appliance architecture of the present invention is based on a function-specific hardware platform on which it is coupled with an application foundation software and an information appliance application. The present invention provides an application foundation which is the first platform designed from the beginning for the creation of information appliances. The primary purpose of the application foundation is to provide an easy to use and portable environment for information appliance application development and deployment. The present invention enables a new class of consumer appliances for home, schools, and offices that provide access to information sources in low cost, small footprint, highly reliable appliances. The appliances blend intuitive ease of use, convenience and affordability of consumer appliances, with the power of computers, to make electronic information far more accessible.

The foregoing description of a preferred embodiment of the invention has been presented for purposes of illustration and description. It is not intended to be exhaustive or to limit the invention to the precise forms disclosed. Obviously, many modifications and variations will be apparent to practitioners skilled in this art. It is intended that the scope of the invention be defined by the following claims and their equivalents.

What is claimed is:

1. An information appliance, comprising:

a processor;

a display, coupled to the processor;

an input/output device coupled to an information source and to the processor;

a user input device coupled to the processor;

working memory coupled to the processor; and memory coupled to the processor, storing an executable version of appliance operating software and application software, the appliance operating software including logic executed by the processor which manages information flow from the information source through the working memory to the display, and application software including logic executed by the processor and responsive to user input which manages selection of information from said information source, wherein the appliance operating software includes an appliance operating system adapted for the appliance processor, a system library including logic providing a development interface to the application software, and an appliance service module providing an abstraction function between the system library and the appliance operating system, the appliance service module being replaceable with a development platform service module providing the abstraction function between the system library and an operating system in a development platform allowing portability of the application software between the development platform and the information appliance.

2. The information appliance of claim 1, wherein the information source comprises Internet accessible information, and wherein the appliance operating software includes Internet access logic, and the application software includes an Internet browser.

3. The information appliance of claim 1, wherein the information source comprises a mass storage device.

4. The information appliance of claim 1, wherein the information source comprises Internet accessible electronic mail, and wherein the application software includes electronic mail logic.

5. The information appliance of claim 1, wherein the display comprises one of an NTSC monitor and a PAL monitor, and the appliance operating software includes graphics logic for the monitor.

6. The information appliance of claim 1, wherein the display comprises a bit mapped graphics monitor, and the appliance operating software includes graphics logic for the monitor.

7. The information appliance of claim 1, wherein the appliance operating software includes memory management logic for managing allocation of the working memory.

8. The information appliance of claim 7, wherein the memory management logic includes information caching logic for information retrieved from the information source.

9. The information appliance of claim 1, wherein the working memory includes less than 5 megabytes of memory space.

10. The information appliance of claim 1, wherein the working memory includes less than 2 Megabytes of memory space.

11. The information appliance of claim 1, wherein the information source comprises Internet accessible information, and wherein the appliance operating software includes Internet access logic and memory management logic which manages allocation of memory for the information retrieved from the Internet, of memory used for the application software, and memory used for the appliance operating software.

12. The information appliance of claim 11, wherein the memory management logic includes information caching logic for information retrieved from the Internet.

13. An information appliance, the information appliance having an appliance hardware architecture including at least one peripheral by which information from an information source is provided to the information appliance, a display, a processor, and memory, and having an appliance operating system, comprising:

an application program including logic responsive to user input which manages retrieval of information from said information source, and display of the retrieved information;

a system library module, including an application interface, memory management resources, process control resources, and input/output device call resources, the application interface to the application program for memory management, process control calls, and input/output calls, the memory management resources, accessible by the application program through the application interface, providing management of allocation of memory for the information retrieved from the information source, of memory used for the application program, and memory used for system programs, the process control resources, accessible by the application program through the application interface, to provide for control of processes used by the application program, the input/output device call resources, accessible by the application program through the application interface, to provide for communication with peripheral devices in the hardware appliance architecture, and an appliance operating system service module, coupled with the system library module, which provides an abstraction function between the system library module and the appliance operating system on the appliance hardware architecture.

14. The information appliance of claim 13, including:

a device driver library, coupled with the system library module, providing a device independent interface to logic in the application program making input/output calls.

15. The information appliance of claim 13, wherein the information source comprises Internet accessible information, and wherein the system library module includes Internet access logic.

16. The information appliance of claim 13, wherein the information source comprises a mass storage device.

17. The information appliance of claim 13, wherein the information source comprises Internet accessible electronic mail, and wherein the system library module includes electronic mail logic.

18. The information appliance of claim 13, wherein the display comprises one of an NTSC monitor and a PAL monitor, and the system library module includes graphics logic for the monitor.

19. The information appliance of claim 13, wherein the display comprises a bit mapped graphics monitor, and the system library module includes graphics logic for the monitor.

20. The information appliance of claim 13, wherein the memory management resources include information caching logic for information retrieved from the information source.

21. The information appliance of claim 13, wherein the information source comprises Internet accessible information, and wherein the system library module includes Internet access logic in communication with the memory management resources.

22. The information appliance of claim 21, wherein the memory management resources include information caching logic for information retrieved from the Internet.

23. An information appliance, the information appliance having an appliance hardware architecture including at least one peripheral by which information from an information source is provided to the information appliance, a display, a processor, and memory, and having an appliance operating system, comprising:

an application program including logic responsive to user input which manages retrieval of information from said information source, and display of the retrieved information;

a system library module, including an application interface, memory management resources, process control resources, and input/output call resources, the application interface to the application program for memory management, process control calls, and input/output calls, the memory management resources, accessible by the application program through the application interface, providing management of the memory in the hardware appliance, independent of the appliance operating system and of the application program, and including information caching logic for information retrieved from the information source, the process control resources, accessible by the application program through the application interface, to provide for control of processes used by the application program, and the input/output call resources, accessible by the application program through the application interface, to provide for communication with peripheral devices in the hardware appliance architecture;

a device driver library, coupled with the system library module, providing a device independent interface to logic in the application program making input/output calls; and an appliance operating system service module, coupled with the system library module, which provides an abstraction function between the system library module and the appliance operating system on the appliance hardware architecture.

24. The information appliance of claim 23, wherein the information source comprises Internet accessible information, and wherein the system library module includes Internet access logic.

25. The information appliance of claim 23, wherein the information source comprises a mass storage device.

26. The information appliance of claim 23, wherein the information source comprises Internet accessible electronic mail, and wherein the system library module includes electronic mail logic.

27. The information appliance of claim 23, wherein the display comprises one of an NTSC monitor and a PAL monitor, and the system library module includes graphics logic for the monitor.

28. The information appliance of claim 23, wherein the display comprises a bit mapped graphics monitor, and the system library module includes graphics logic for the monitor.

29. A method for development of an application program for an information appliance which manages retrieval of information from an information source, and display of the retrieved information on the information appliance, the information appliance having an appliance hardware architecture including at least one input/output device by which information from an information source is provided to the information appliance, a display, a processor, and memory, and having an appliance operating system adapted for the appliance hardware architecture, comprising:

providing on a development workstation, a system library module, including an application interface, process control resources, and input/output call resources, the application interface to the application program for process control calls, and input/output calls, the process control resources, accessible through the application interface, to provide for control of processes used by the application program, and the input/output call resources, accessible through the application interface, to provide for communication with peripheral devices in the hardware appliance architecture;

providing an operating system service module on the development workstation, coupled with the system library module, which provides an abstraction function between the system library module and the development workstation;

developing the application program on the development workstation using the system library module;

replacing the operating system service module on the development workstation with an appliance operating system service module, which provides the abstraction function between the system library module and the appliance operating system on the appliance hardware architecture; and producing an executable version of the application program for the appliance operating system on the appliance hardware architecture using the appliance operating system service module.

30. The method of claim 29, wherein the system library module includes memory management resources, accessible by the application program through the application interface, providing management of the memory in the hardware appliance, and including information caching logic for information retrieved from the information source.

31. The method of claim 29, including:

providing a device driver library on the development workstation, coupled with the system library module, providing a device independent interface to logic in the application program making input/output calls.

32. The method of claim 29, wherein the process control calls include thread functions and error handling functions.

33. A method for development of an application program for an information appliance which manages retrieval of information from an information source, and display of the retrieved information on the information appliance, the information appliance having an appliance hardware architecture including at least one input/output device by which information from an information source is provided to the information appliance, a display, a processor, and memory, and having an appliance operating system adapted for the appliance hardware architecture, comprising:

providing on a development workstation, a system library module, including an application interface, process control resources, and input/output call resources, the application interface to the application program for process control calls, and input/output calls, the process control resources, accessible through the application interface, to provide for control of processes used by the application program including thread functions and error handling functions, memory management resources, accessible by the application program through the application interface, providing management of the memory in the hardware appliance, and including information caching logic for information retrieved from the information source, and the input/output call resources, accessible through the application interface, to provide for communication with peripheral devices in the hardware appliance architecture;

providing an operating system service module on the development workstation, coupled with the system library module, which provides an abstraction function between the system library module and the development workstation;

providing a device driver library on the development workstation, coupled with the system library module, providing a device independent interface to logic in the application program making input/output calls;

developing the application program on the development workstation using the system library module and the device driver library;

replacing the operating system service module on the development workstation with an appliance operating system service module, which provides the abstraction function between the system library module and the appliance operating system on the appliance hardware architecture; and producing an executable version of the application program for the appliance operating system on the appliance hardware architecture using the appliance operating system service module.

\* \* \* \* \*